(12) United States Patent
Sperka

(10) Patent No.: US 8,162,641 B2
(45) Date of Patent: Apr. 24, 2012

(54) BLOW MOLDING MACHINE FOR PRODUCING HOLLOW BODIES FROM HEATED PREFORMS

(75) Inventor: Wolfgang Sperka, Dingolfing (DE)

(73) Assignee: Krones AG, Neutraubling (DE)

( * ) Notice: Subject to any disclaimer, the term of this patent is extended or adjusted under 35 U.S.C. 154(b) by 33 days.

(21) Appl. No.: 12/795,897

(22) Filed: Jun. 8, 2010

(65) Prior Publication Data
US 2010/0310691 A1 Dec. 9, 2010

(30) Foreign Application Priority Data
Jun. 9, 2009 (DE) .......................... 10 2009 024 408

(51) Int. Cl.
*B29C 49/58* (2006.01)

(52) U.S. Cl. ........................................... 425/3; 425/535
(58) Field of Classification Search ............... 425/3, 535
See application file for complete search history.

(56) References Cited

U.S. PATENT DOCUMENTS

| | | | |
|---|---|---|---|
| 6,722,868 B1 * | 4/2004 | Evrard ............................... 425/3 |
| 7,165,956 B2 * | 1/2007 | Santais et al. ...................... 425/3 |
| 2004/0071810 A1 * | 4/2004 | Hsu et al. ....................... 425/162 |
| 2010/0252945 A1 * | 10/2010 | Eudier et al. ................. 264/40.5 |

* cited by examiner

*Primary Examiner* — Robert B Davis
(74) *Attorney, Agent, or Firm* — Marshall, Gerstein & Borun LLP

(57) ABSTRACT

A blow molding machine for producing hollow bodies from heated preforms has at least one blow mold and at least one blow nozzle which can be moved vertically relative with respect to each other via a drive. To design the drive more flexibly, an electromagnetic drive is employed.

6 Claims, 1 Drawing Sheet

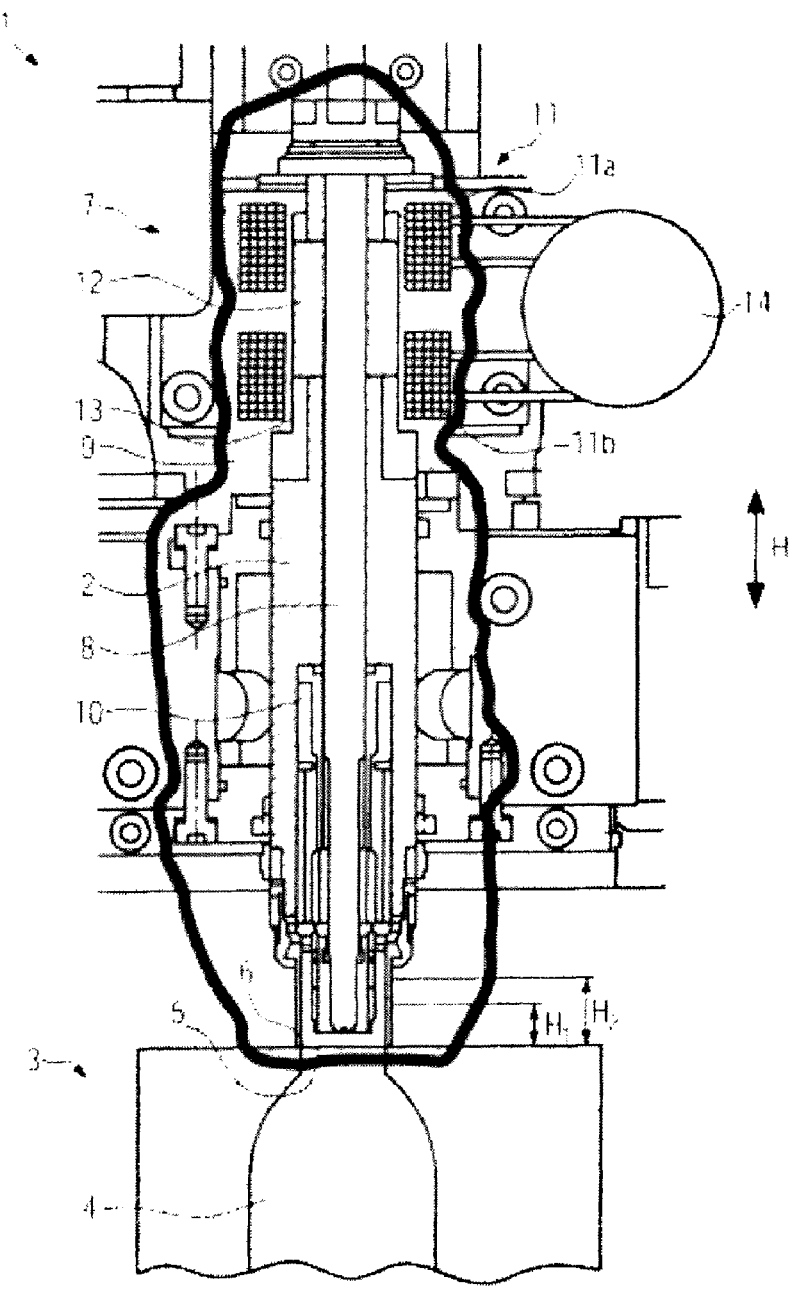

BLOW MOLDING MACHINE FOR PRODUCING HOLLOW BODIES FROM HEATED PREFORMS

CROSS-REFERENCE TO RELATED APPLICATION

The present application claims the benefit of priority of German Application No. 102009024408.5, filed Jun. 9, 2009. The entire text of the priority application is incorporated herein by reference in its entirety.

FIELD OF THE DISCLOSURE

The disclosure relates to a blow molding machine for producing hollow bodies from heated preforms, such as used in forming containers for beverage bottling operations.

BACKGROUND

Such a blow molding machine is known from EP 1 328 396. In the known blow molding machine, the relative movement between the blow nozzle and the blow mold which is required for introducing the preform into the blow mold and for blowing is achieved by a merely mechanical drive of the vertical movement. The mechanical drive contains a cam roller which, in connection with a radial cam, defines the vertical movement and the position of the blow nozzle. The cam roller is associated to the blow nozzle and the radial cam to the blow mold, so that by the usual relative rotation about a vertical axis of the blow mold and the blow nozzle, the vertical movement is derived from the drive of the rotary motion. A disadvantage of this embodiment is the lack of flexibility of the drive as the radial cam is fixed locally and with respect to the dimension of the movement.

SUMMARY OF THE DISCLOSURE

The object underlying the disclosure is to provide a blow molding machine offering greater flexibility with respect to the vertical movement.

The electromagnetic drive according to the disclosure can be employed and designed essentially more universally than the fixed mechanical drive. For example, the stroke, i.e. the amount of the vertical movement, or the response time or the like can be modified in a simple manner.

Magnet coils in blow molding machines have been only used up to now for applying the contact force between the blow nozzle and the blow mold, i.e. merely statically, to act against the pressure of the high-pressure gas. Such an application is known from EP 1 572 435.

Preferably, at least one magnet coil is provided for a predetermined stroke, the return force being applied by gravity. However, it is also possible to employ one magnet coil each for each direction of movement.

With an electromagnetic drive, it is furthermore easily possible to realize various lengths of stroke, at least one magnet coil being provided for each length of stroke.

Finally, in the electromagnetic drive, the predetermined force of pressure of the blow nozzle against the blow mold can also be realized.

By means of a spring, a linear relation between the electric current and the stroke can be adjusted.

In an advantageous embodiment, the blow nozzle consists, at least in sections, of a ferromagnetic material. It is particularly preferred to mount permanent magnets to the blow nozzle. The ferromagnetic material or the permanent magnets cause a reduction of a force required for the drive. Thus, the magnet coils require less energy.

BRIEF DESCRIPTION OF THE DRAWINGS

In the following, one embodiment of the disclosure is illustrated more in detail with reference to the single FIGURE.

DETAILED DESCRIPTION OF THE PREFERRED EMBODIMENT

The FIGURE shows in a partial section a blow molding machine 1 of which here only the blow nozzle 2 and the blow mold 3 are represented. The blow mold 3 is split in a conventional way, with a mold cavity 4 and an opening 5 facing upwards which is opposite to the blow nozzle 2. A non-depicted preform is inserted into the cavity 4 and the opening 5 and blown via the blow nozzle 2 to the shape defined by the mold cavity 4.

The blow nozzle 2 has a tubular design and contains at its lower end a blow opening 6 opposite to the opening 5. The openings 5 and 6 are brought to a predetermined distance for introducing the preform and to a pressing contact for blowing. This movement is accomplished via a vertical movement H in the direction of the double arrow of the blow nozzle 2. This vertical movement H is realized via a drive 7.

Except for the drive 7, the blow nozzle 2 is of a conventional type, i.e. it contains a common stretch mandrel 8 movable relative with respect to the blow nozzle 2, a bearing and guide 9 for the movement of the blow nozzle 2 in the direction of the double arrow H, the necessary supplies 10 of blowing gas, and the actual nozzle arranged at the lower end, and the like.

The electromagnetic drive 7 contains at least one magnet coil 11 which extends annularly around the blow nozzle 2 and a magnet body 12 fixed to the blow nozzle 2 which is preferably simultaneously used as a guide for the blow nozzle 2 in a sliding guide bore 13 of the mounting 9. The magnet body can be embodied as separate part from a ferromagnetic material or consist of the blow nozzle consisting at least in sections of a ferromagnetic material, or designed as permanent magnet.

In the represented embodiment, two magnet coils 11a, 11b superimposed in the direction H are provided, the magnet coil 11a being used for lifting and the magnet coil 11b located thereunder being used for lowering the blow nozzle 2 in a movement over a single stroke H1.

Further magnet coils can be provided to realize deviating lengths of stroke. For example, a third magnet coil can be provided above the first magnet coil 11a which realizes a second, longer stroke H2, the lower magnet coil 11b causing the return into the lowered position drawn in FIG. 1 for both strokes.

All magnet coils 11 are supplied via a power source 14 and provided with a non-depicted control means which controls the stroke and the application of the magnet coil required in each case.

Furthermore, the force of pressure between the two openings 5, 6 can also be caused electromagnetically, which can be realized, for example, by an additional coil in the region of the openings 5, 6 or by the lower coil 11b.

Furthermore, a non-depicted spring can be provided which acts against the magnetic force to cause a linear behavior between the electric current and the stroke.

In variation to the described and drawn embodiment, the electromagnetic drive according to the invention can also be employed in differently constructed blow nozzles and/or blow molds.

It would be conceivable to employ such a system not only for the blow nozzle. Such magnetic drives can also be employed for all elements which transfer the mold cavity of the blow mold into a closed state. One of these elements represents a non-depicted bottom which can be added separately. The bottom closes a spatial area located opposite to the blow nozzle. A further one of these elements is the stretch mandrel. A stretching force adaptable by the control and that can be adjusted via the current flow in the magnet coils would be advantageous for the stretch mandrel. Theoretically, such an electromagnetic drive would also be conceivable for parts for mold halves of the blow mold.

In an advantageous embodiment, at least two of these elements are controlled by means of such an electromagnetic drive.

The invention claimed is:

1. Blow molding machine for producing hollow bodies from heated preforms, comprising at least one blow mold and at least one blow nozzle which can be vertically moved relative with respect to each other via a drive, and where the drive is accomplished electromagnetically.

2. Blow molding machine according to claim 1, wherein the electromagnetic drive contains at least one magnet coil for a predetermined stroke.

3. Blow molding machine according to claim 2, and a plurality of different lengths of stroke (H1, H2) to be realized by at least one magnet coil each.

4. Blow molding machine according to claim 1, wherein a predetermined force of pressure for pressing the blow nozzle against the blow mold is applied electromagnetically.

5. Blow molding machine according to claim 1, wherein a spring acting against the magnetic force is provided for a linear relation between the electric current and the stroke (H).

6. Blow molding machine according to claim 1, wherein the electromagnetic drive comprises at least one magnet coil and a ferromagnetic material or at least one permanent magnet.

* * * * *